US011951970B2

(12) United States Patent
Ganzel (10) Patent No.: US 11,951,970 B2
(45) Date of Patent: Apr. 9, 2024

(54) BRAKE SYSTEM WITH PLUNGER-BASED SECONDARY BRAKE MODULE (71) Applicant: ZF Active Safety US Inc., Livonia, MI (US)

(72) Inventor: Blaise J. Ganzel, Ann Arbor, MI (US)

(73) Assignee: ZF Active Safety US Inc., Livonia, MI (US)

( * ) Notice: Subject to any disclaimer, the term of this patent is extended or adjusted under 35 U.S.C. 154(b) by 231 days.

(21) Appl. No.: 17/400,178

(22) Filed: Aug. 12, 2021

(65) Prior Publication Data
US 2023/0050897 A1 Feb. 16, 2023

(51) Int. Cl.
*B60T 8/94* (2006.01)
*B60T 8/175* (2006.01)
(Continued)

(52) U.S. Cl.
CPC ................ *B60T 8/94* (2013.01); *B60T 8/175* (2013.01); *B60T 8/176* (2013.01); *B60T 13/142* (2013.01); *B60T 13/161* (2013.01); *B60T 13/168* (2013.01); *B60T 13/588* (2013.01); *B60T 13/62* (2013.01); *B60T 13/662* (2013.01);
(Continued)

(58) Field of Classification Search
CPC . B60T 8/94; B60T 8/175; B60T 8/176; B60T 8/4081; B60T 13/142; B60T 13/161; B60T 13/168; B60T 13/20; B60T 13/662; B60T 13/745; B60T 13/588; B60T 13/62; B60T 13/686; B60T 11/20; B60T 15/028;
(Continued)

(56) References Cited

U.S. PATENT DOCUMENTS 9,145,119 B2 * 9/2015 Biller .................... B60T 8/17
10,752,228 B2 8/2020 Peichl et al.
(Continued)

FOREIGN PATENT DOCUMENTS

DE 3922861 A1 * 1/1991 ............ B60T 13/168
DE 102012221346 A1 * 6/2014 ............ B60T 13/146
(Continued)

OTHER PUBLICATIONS

Translation DE 3922861 A1. (Year: 1991).*
(Continued)

*Primary Examiner* — Thomas J Williams
(74) *Attorney, Agent, or Firm* — Robert James Harwood (57) ABSTRACT

A brake system for actuating a pair of front wheel brakes and a pair of rear wheel brakes is selectively operable during a manual push-through mode. A primary power transmission unit actuates at least one of wheel brakes in a normal braking mode. A secondary power transmission unit actuates the front wheel brakes in a backup braking mode. A primary electronic control unit controls at least one of the primary power transmission unit and a pair of rear brake motors. A secondary electronic control unit controls at least one of the secondary power transmission unit and the rear brake motors. An ABS modulator arrangement is hydraulically interposed between at least one of first and second three-way valves and at least a selected wheel brake. A multiplex control valve arrangement is hydraulically interposed between the secondary power transmission unit and the front wheel brakes.

19 Claims, 2 Drawing Sheets

(51) Int. Cl.
  *B60T 8/176*  (2006.01)
  *B60T 8/40*  (2006.01)
  *B60T 13/14*  (2006.01)
  *B60T 13/16*  (2006.01)
  *B60T 13/20*  (2006.01)
  *B60T 13/58*  (2006.01)
  *B60T 13/62*  (2006.01)
  *B60T 13/66*  (2006.01)
  *B60T 13/68*  (2006.01)
  *B60T 13/74*  (2006.01)
  *B60T 15/02*  (2006.01)
  *B60T 11/20*  (2006.01)

(52) U.S. Cl.
  CPC .......... *B60T 13/686* (2013.01); *B60T 13/745* (2013.01); *B60T 15/028* (2013.01); *B60T 8/4081* (2013.01); *B60T 11/20* (2013.01); *B60T 13/20* (2013.01); *B60T 2270/10* (2013.01); *B60T 2270/20* (2013.01); *B60T 2270/402* (2013.01); *B60T 2270/404* (2013.01); *B60T 2270/82* (2013.01)

(58) Field of Classification Search
  CPC ............ B60T 2270/10; B60T 2270/20; B60T 2270/402; B60T 2270/404; B60T 2270/82
  See application file for complete search history.

(56) References Cited

U.S. PATENT DOCUMENTS

| | | | | |
|---|---|---|---|---|
| 2013/0207452 | A1* | 8/2013 | Gilles | B60T 8/4081 303/9.62 |
| 2013/0213025 | A1* | 8/2013 | Linden | B60T 13/741 60/533 |
| 2013/0291535 | A1* | 11/2013 | Leiber | F16K 31/408 60/545 |
| 2014/0131154 | A1* | 5/2014 | Ganzel | B60T 13/588 303/14 |
| 2017/0361825 | A1* | 12/2017 | Drumm | B60T 8/4081 |
| 2018/0215366 | A1* | 8/2018 | Leiber | B60T 13/745 |
| 2019/0092304 | A1 | 3/2019 | Ganzel | |
| 2019/0225205 | A1* | 7/2019 | Ganzel | B60T 13/745 |
| 2020/0070797 | A1* | 3/2020 | Plewnia | B60T 15/041 |
| 2020/0198607 | A1* | 6/2020 | Weitze | B60T 8/4081 |
| 2020/0307538 | A1 | 10/2020 | Ganzel | |
| 2021/0053540 | A1* | 2/2021 | Besier | B60T 13/58 |
| 2023/0001902 | A1 | 1/2023 | Ganzel | |
| 2023/0001903 | A1 | 1/2023 | Ganzel et al. | |
| 2023/0050897 | A1* | 2/2023 | Ganzel | B60T 13/662 |

FOREIGN PATENT DOCUMENTS

| | | | | |
|---|---|---|---|---|
| DE | 102013222859 | A1 * | 5/2015 | ............ B60T 13/662 |
| WO | 2019/195542 | A1 | 10/2019 | |
| WO | WO-2019195542 | A1 * | 10/2019 | ............. B60T 11/20 |

OTHER PUBLICATIONS

Translation DE 10 2012221346 A1. (Year: 2014).*
Machine translation, DE 10 2013 222859 A1. (Year: 2015).*
Breuer Bert, Bremsenhandbuch 5th Edition, Grundlagen, Komponenten, Systeme, Fahrdynamik, pp. 1-7.
German Search Report for corresponding German Application Serial No. 10 2022 208 245.1, dated Apr. 13, 2023, pp. 1-16.

* cited by examiner

BRAKE SYSTEM WITH PLUNGER-BASED SECONDARY BRAKE MODULE

TECHNICAL FIELD

This disclosure relates to an apparatus and method for use of a brake system and, more particularly, to a method and apparatus of a hydraulic brake system for actuating a pair of front brakes and a pair of rear brakes, including a plunger-based secondary brake module.

BACKGROUND

A brake system may include anti-lock control including a pedal-operated hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

Descriptions of prior art brake systems are in U.S. Pat. No. 10,730,501, issued 4 Aug. 2020 to Blaise Ganzel and titled "Vehicle Brake System with Auxiliary Pressure Source", and in U.S. Patent Application Publication No. 2020/0307538, published 1 Oct. 2020 by Blaise Ganzel and titled "Brake System with Multiple Pressure Sources", both of which are incorporated herein by reference in their entirety for all purposes.

SUMMARY

In an aspect, a brake system for actuating a pair of front wheel brakes and a pair of rear wheel brakes is disclosed. The system includes a reservoir and a master cylinder operable to provide a brake signal responsive to actuation of a brake pedal connected thereto. The master cylinder is selectively operable during a manual push-through mode by actuation of the brake pedal to generate brake actuating pressure to at least one output for hydraulically actuating at least one of the pair of front wheel brakes and the pair of rear wheel brakes. A primary power transmission unit is configured for selectively providing pressurized hydraulic fluid for actuating at least one of the pair of front wheel brakes and the pair of rear wheel brakes in a non-failure normal braking mode. A secondary power transmission unit is configured for selectively providing pressurized hydraulic fluid for actuating the pair of front wheel brakes in a backup braking mode. A pair of rear brake motors selectively electrically actuate respective rear wheel brakes. A primary electronic control unit controls at least one of the primary power transmission unit and the pair of rear brake motors. A secondary electronic control unit controls at least one of the secondary power transmission unit and the pair of rear brake motors. A pedal simulator is in selective fluid communication with the master cylinder for providing predetermined brake pedal response. First and second two-position three-way valves are each hydraulically connected with the master cylinder, the primary power transmission unit, and at least a selected wheel brake of each of the pairs of the front and rear wheel brakes. The first and second three-way valves selectively control hydraulic fluid flow from a chosen one of the master cylinder and the primary power transmission unit to at least the selected ones of the front and rear wheel brakes. An ABS modulator arrangement is hydraulically interposed between at least one of the first and second three-way valves and at least a selected wheel brake of the pair of front wheel brakes and the pair of rear wheel brakes. A multiplex control valve arrangement is hydraulically interposed between the secondary power transmission unit and the pair of front wheel brakes.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
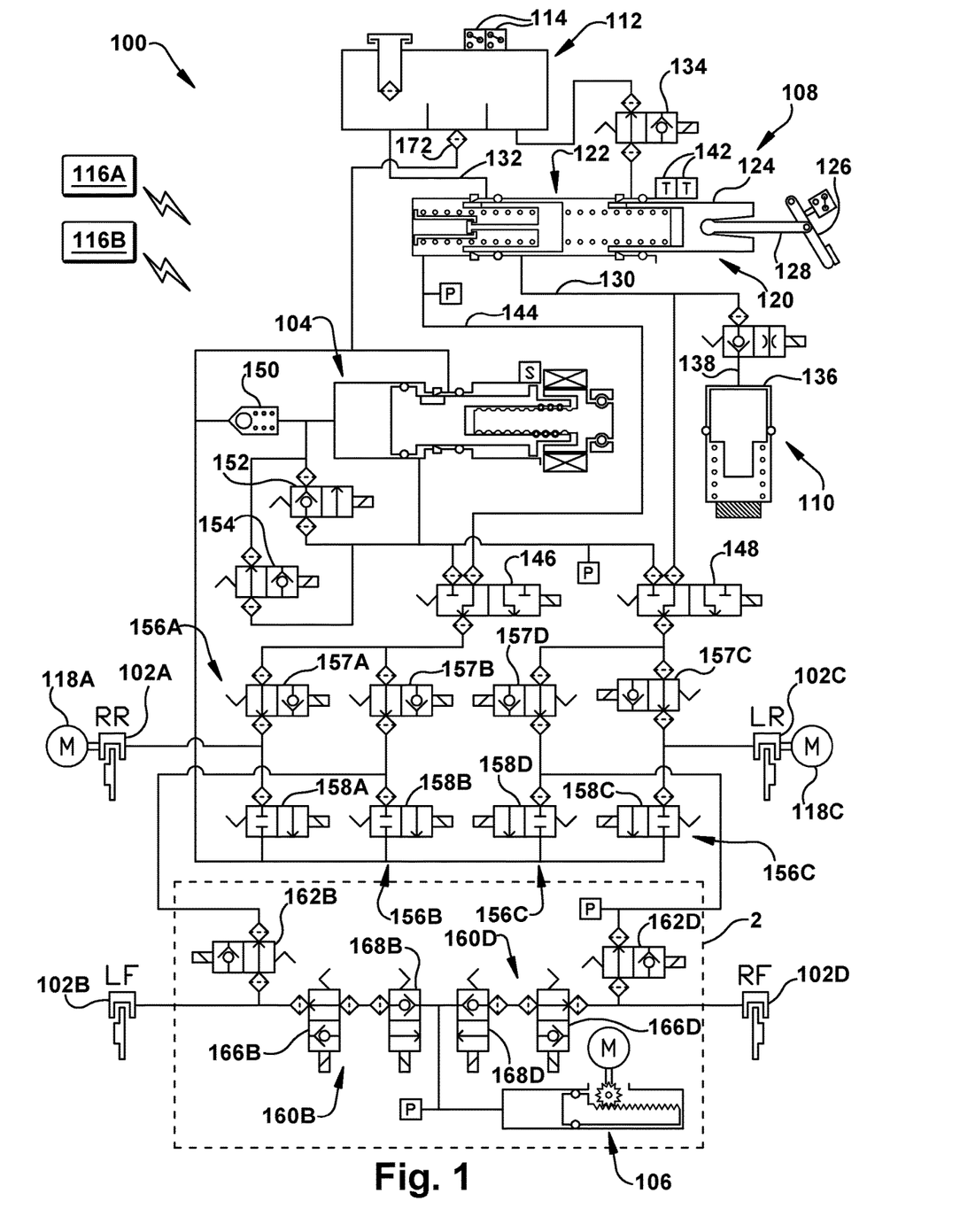
FIG. 1 is a schematic hydraulic diagram of a brake system according to an aspect of the present invention, in a first configuration.
Figure 2:
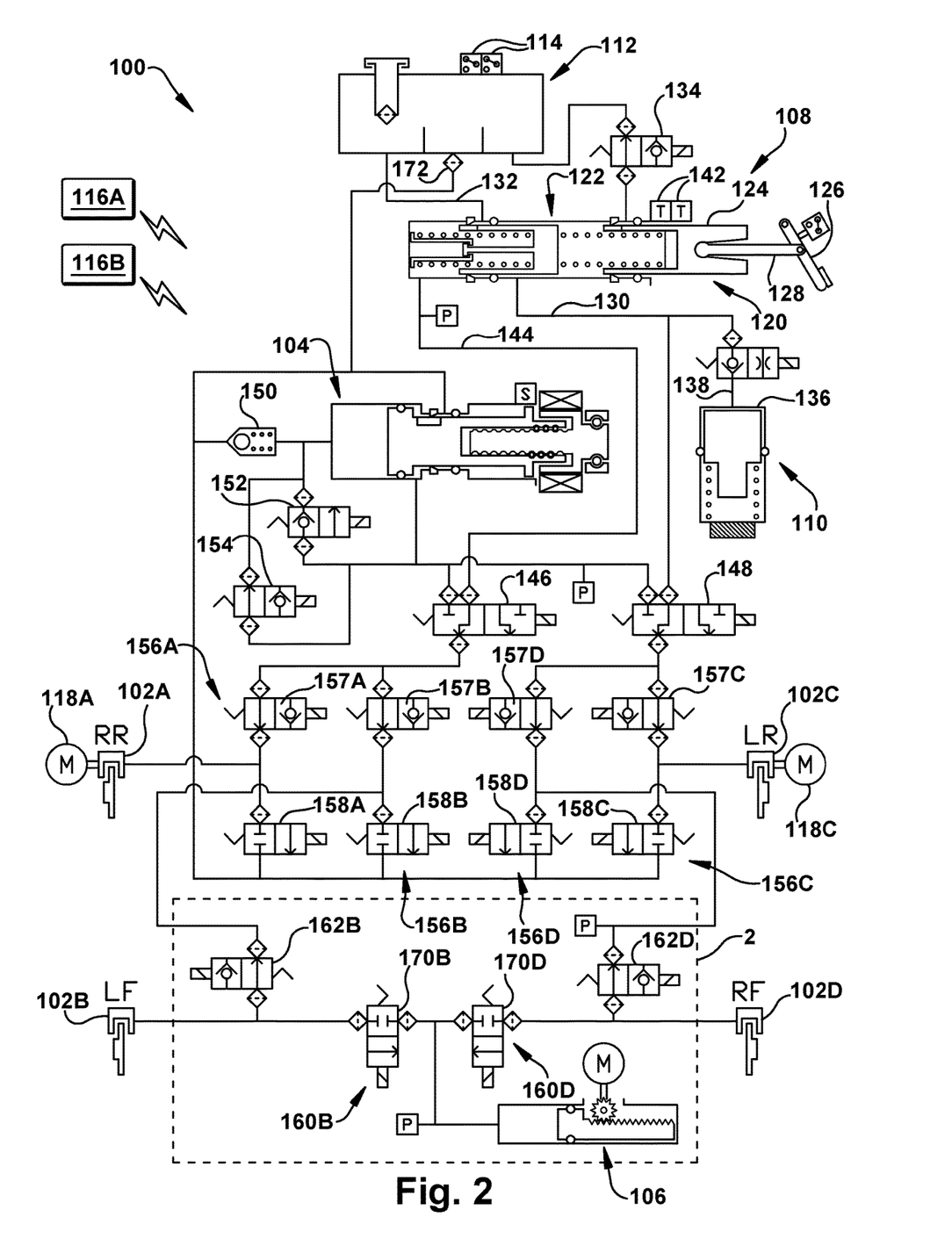
FIG. 2 is a schematic hydraulic diagram of the brake system of FIG. 1, in a second configuration.

FIGS. 1-2 schematically depict a brake system 100 for actuating a pair of front wheel brakes and a pair of rear wheel brakes, in first and second configurations, respectively. The brake system 100 is shown here as a hydraulic braking system in which fluid pressure is utilized to apply braking forces for the brake system 100. The brake system 100 may suitably be used on a ground vehicle, such as an automotive vehicle having four wheels with a wheel brake associated with each wheel. Furthermore, the brake system 100 can be provided with other braking functions such as anti-lock braking (ABS) and other slip control features to effectively brake the vehicle. Components of the brake system 100 may be housed in one or more blocks or housings. The block or housing may be made from solid material, such as aluminum, that has been drilled, machined, or otherwise formed to house the various components. Fluid conduits may also be formed in the block or housing.

In the illustrated embodiment of the brake system 100, there are four wheel brakes 102A, 102B, 102C, and 102D. The wheel brakes 102A, 102B, 102C, and 102D can have any suitable wheel brake structure operated electrically and/or by the application of pressurized brake fluid. Each of the wheel brakes 102A, 102B, 102C, and 102D may include, for example, a brake caliper mounted on the vehicle to engage a frictional element (such as a brake disc) that rotates with a vehicle wheel to effect braking of the associated vehicle wheel. The wheel brakes 102A, 102B, 102C, and 102D can be associated with any combination of front and rear wheels of the vehicle in which the brake system 100 is installed. For example, the brake system 100 may be configured as a diagonal split system, as shown, such that a primary power transmission unit 104 is configured for selectively providing pressurized hydraulic fluid for actuating at least one of the pair of front wheel brakes 102B and 102D and to the pair of rear wheel brakes 102A and 102C, in a non-failure normal braking mode, as will be discussed below. In the depicted embodiments of the brake system 100, the primary power transmission unit 104 provides fluid to both of the pair of front wheel brakes 102B and 102D and the pair of rear wheel brakes 102A and 102C, in the non-failure normal braking mode.

A secondary or backup pressure circuit (indicated generally by the dashed line "2" in the Figures) may include a secondary power transmission unit 106 configured for selectively providing pressurized hydraulic fluid for actuating the pair of front wheel brakes 102B and 102D, when the brake system 100 is in a backup braking mode, as will be discussed in more detail below.

In this example, the wheel brake 102A may be associated with a right rear wheel of the vehicle in which the brake system 100 is installed, and the wheel brake 102B may be associated with the left front wheel. The wheel brake 102C may be associated with the left rear wheel, and the wheel brake 102D may be associated with the right front wheel. Alternatively, though not depicted here, the brake system 100 may be configured as a vertical split brake system such that the wheel brakes 102A and 102B are associated with wheels at the front or rear axle of the vehicle, and the wheel brakes 102C and 102D are associated with wheels at the other axle of the vehicle. (It is contemplated that various other components, such as electric brake motors, could be reconfigured by one of ordinary skill in the art to accommodate such an altered system in certain use environments.)

The brake system 100 also includes a brake pedal unit, indicated generally at 108, a pedal simulator, indicated generally at 110, and a fluid reservoir 112. The reservoir 112 stores and holds hydraulic fluid for the brake system 100. The fluid within the reservoir 112 is preferably held at or about atmospheric pressure, but the fluid may be stored at other pressures if desired. The reservoir 112 is shown schematically having three tanks or sections with fluid conduit lines connected thereto. The sections can be separated by several interior walls within the reservoir 112 and are provided to prevent complete drainage of the reservoir 112 in case one of the sections is depleted due to a leakage via one of the three lines connected to the reservoir 112. Alternatively, the reservoir 112 may include multiple separate housings. The reservoir 112 may include at least one fluid level sensor 114 (two shown, for redundancy) for detecting the fluid level of one or more of the sections of the reservoir 110.

The primary power transmission unit 104 of the brake system 100 functions as a source of pressure to provide a desired pressure level to the hydraulically operated wheel brakes 102A, 102B, 102C, and 102D during a typical or normal brake apply. After a brake apply, fluid from the hydraulically operated ones of the wheel brakes 102A, 102B, 102C, and 102D may be returned to the power transmission unit 104 and/or be diverted to the reservoir 112. In the depicted embodiments, the primary power transmission unit 108 is shown as being a dual acting plunger type power transmission unit, though a single acting plunger or any other desired type of controllable hydraulic fluid pressurizer could be also or instead provided to the brake system 100. It is also contemplated that other configurations (not shown) of the brake system 100 could include hydraulic control of just a selected one of the pair of front wheel brakes and the pair of rear wheel brakes (with the other pair being electrically controlled/actuated). One of ordinary skill in the art would be readily able to provide such an arrangement for a desired use environment, following aspects of the present invention.

The secondary power transmission unit 106 of the brake system 100 functions as a source of pressure to provide a desired pressure level to a selected one of the pair of front wheel brakes 102B and 102D and the pair of rear wheel brakes 102A and 102C in a backup or "failed" situation, when, for some reason, the primary power transmission unit 104 is unable to provide fluid to those selected wheel brakes. Here, the secondary power transmission unit 106 is connected to the left front wheel brake 102B and the right front wheel brake 102D in a secondary pressure circuit. In the depicted embodiments, the secondary power transmission unit 108 is shown as being a rack-and-pinion type power transmission unit, such as that disclosed in co-pending U.S. patent application Ser. No. 17/366,715, filed 2 Jul. 2021 and titled "Apparatus and Method for Selectively Actuating Wheel Brakes of a Hydraulic Brake System" (incorporated herein by reference in its entirety). Another example of a suitable secondary power transmission unit 108 is the ball-screw type disclosed in co-pending U.S. patent application Ser. No. 17/366,682, filed 2 Jul. 2021 and titled "Apparatus and Method for Control of a Hydraulic Brake By Wire System" (incorporated herein by reference in its entirety). A single acting plunger, dual acting plunger, or any other desired type of controllable hydraulic fluid pressurizer (including the aforementioned rack-and-pinion and ball-screw types) could be also or instead provided to the brake system 100 for use as a primary or secondary power transmission unit 104 or 106.

The brake system 100 also includes at least one electronic control unit ("ECU") 116, with primary and secondary ECUs 116A, 116B being shown and described herein. The ECUs 116A, 116B may include microprocessors and other electrical circuitry. The ECUs 116A, 116B receive various signals, process signals, and control the operation of various electrical components of the brake system 100 in response to the received signals, in a wired and/or wireless manner. The ECUs 116A, 116B can be connected to various sensors such as the reservoir fluid level sensor 114, pressure sensors, travel sensors, switches, wheel speed sensors, and steering angle sensors. The ECUs 116A, 116B may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECUs 116A, 116B may be connected to the instrument cluster for collecting and supplying information related to warning indicators such as an ABS warning light, a brake fluid level warning light, and a traction control/vehicle stability control indicator light.

As shown in the Figures, a pair of rear brake motors 118A, 118C may be provided for selectively electrically actuating respective rear wheel brakes 102A and 102C, at least in a parking brake mode which acts in a complementary manner to the hydraulically actuated surface brakes 102A, 102C. Whether or not the rear brake motors 118A, 118C function during normal non-failure braking as parking brakes, however, the rear brake motors 118A, 118C could be used in a backup mode as electrically actuated substitutes for the hydraulically operated pair of rear wheel brakes 102A, 102C when hydraulic operation of the rear wheel brakes is not available, for some reason. Accordingly, the primary electronic control unit 116A may be provided for controlling at least one of the primary power transmission unit 104 and the pair of rear brake motors 118 (e.g., in a normal non-failure braking mode), and the secondary electronic control unit 116B may be provided for controlling at least one of the secondary power transmission unit 106 and the pair of rear brake motors 118 (e.g., in a backup braking mode), though it is contemplated that a selected one of the electronic control units 116 could control the rear brake motors 118 in both modes of operation.

As shown schematically in FIG. 1, the brake pedal unit 108 includes a master cylinder 120 with a housing 122 defining a longitudinally extending bore for slidably receiving various cylindrical pistons and other components therein. Examples of such components are the first and second springs longitudinally extending in series within the bore, as shown in the Figures. Note that the housing 122 is not specifically schematically shown in the Figures, but instead the walls of the longitudinally extending bore are schematically illustrated. The housing 122 may be formed as a single unit or include two or more separately formed portions coupled together. For some use environments, the master cylinder 120 may be of a tandem master cylinder type.

An MC primary piston 124 is connected with a brake pedal 126 via a linkage arm 128. Leftward movement of the MC primary piston 124 may cause, under certain conditions, a pressure increase within the master cylinder 120.

The pedal simulator 110 is in selective fluid communication with the master cylinder 120 for providing predetermined brake pedal response. As shown, the pedal simulator 110 is connected to the master cylinder 120 via one or more hydraulic passages, but it is contemplated that the "selective fluid communication" could be provided via integration of the pedal simulator 110 into the master cylinder 120.

More specifically, the master cylinder 120 is in fluid communication with the pedal simulator 110 via a master cylinder passage 130. The MC primary piston 124 is slidably disposed in the bore of the housing 122 of the master cylinder 120. When the brake pedal unit 108 is in its rest position (the driver is not depressing the brake pedal 126), the structures of the master cylinder 120 permit at least a portion of fluid communication between the bore of the housing 122 and the reservoir 112 via a reservoir conduit 132. The pedal simulator 110 is therefore in selective fluid communication with the master cylinder 120 for providing predetermined brake pedal 126 response to the driver (e.g., brake pedal "feel").

The brake system 100 may further include an optional solenoid actuated simulator test valve 134 which may be electronically controlled between an open position and a powered closed position; the simulator test valve 134 may include a test valve spring biasing the simulator test valve 134 toward an open condition. The simulator test valve is located fluidly between the reservoir 112 and the master cylinder 120 to selectively permit fluid communication therebetween. The simulator test valve 134 may not be needed during a normal brake apply or for a manual push-through mode. The simulator test valve 134 can be actuated to resist opening under predetermined pressure(s) during various testing modes to determine the correct operation of other components of the brake system 100. For example, the simulator test valve 134 may be actuated to a closed position to prevent venting to the reservoir 112 via the reservoir conduit 132 to monitor fluid flow to determine whether leaks may be occurring through seals of various components of the brake system 100.

A simulation pressure chamber 136 of the pedal simulator 110 is in fluid communication with the pedal simulator passage 138, which is in fluid communication with the master cylinder 120 of the brake pedal unit 108 via simulator valve 140. One example of desired operation of the simulator valve is during a failed and/or initial/startup condition, in which the brake pedal unit 108 is utilized to provide a source of pressurized fluid to the hydraulically operated ones of the wheel brakes 102A, 1028, 102C, and 102D in a push-through manner, as described herein.

The brake pedal unit 108 is connected to the brake pedal 126 and is actuated by the driver of the vehicle as the driver presses on the brake pedal 126. A brake sensor or switch 142 (two shown, for redundancy) may be electrically connected to the ECUs 116A, 1168 to provide a brake signal indicating a depression of the brake pedal 126. That is, the master cylinder 120 is operable to provide a brake signal responsive to actuation of the brake pedal 126 connected thereto.

The brake pedal unit 108 may be used as a back-up source of pressurized fluid to essentially replace the normally supplied source of pressurized fluid from the power transmission unit 104 under certain failed conditions of the brake system 100, and/or upon initial startup of the brake system 100. This situation is referred to as a manual push-through event, or a "manual apply" and may be accomplished in coordination with actuation of the secondary power transmission unit 106 or independently thereof.

In such a push-through mode, the brake pedal unit 108 can supply pressurized fluid to at least one of a master cylinder output 144 and the master cylinder passage 130, which is then routed to the hydraulically operated ones of the wheel brakes 102A, 1028, 102C, and 102D as desired. This flow is pushed through, largely under mechanical pressure upon the brake pedal 126 from the driver's foot, from the master cylinder 120. That is, the master cylinder 120 is selectively operable during a manual push-through mode by actuation of the brake pedal 126 connected to the master cylinder 120 to generate brake actuating pressure to at least one of a first output (here, schematically shown as master cylinder passage 130) and a second output (here, schematically shown as master cylinder output 144) for hydraulically actuating at least one of the pair of front wheel brakes 1028, 102D and the pair of rear wheel brakes 102A, 102C.

First and second two-position three-way valves 146 and 148, respectively, are provided to the brake system 100 as shown in the Figures. Each of the first and second three-way valves 146 and 148 is hydraulically connected with the master cylinder 120, the primary power transmission unit 104, and at least a selected wheel brake of each of the pairs of the front and rear wheel brakes. For example, and is shown in the Figures, the first three-way valve 146 is in fluid communication with the right rear and left front wheel brakes 102A, 1028, and the second three-way valve 148 is in fluid communication with the left rear and right front wheel brakes 102C, 102D. The first and second three-way valves 146 and 148 selectively control hydraulic fluid flow from a chosen one of the master cylinder 120 and the primary power transmission unit 104 to at least the selected ones of the front and rear wheel brakes 102. Through use of the first and second three-way valves 146 and 148, hydraulic fluid can be routed to the wheel brakes 102 in a desired manner (from either the master cylinder 120 or the primary power transmission unit 104) to assist with boosted braking control and provide desired response times and efficient pressure flow to the respective wheel brakes 102 associated with each three-way valve. A single three-way valve 146 or 148 may be used here instead of one normally-closed valve and one normally-open valve for cost and packaging reasons, but also to reduce current draw. This is mainly due to the fact that the normally-open valve would need an undesirably high force spring to avoid it becoming hydraulically locked closed if power is lost during a boosted brake apply, which could trap brake pressure and/or cause unwanted braking when the pedal is released.

The Figures also depict a replenishing check valve 150, which is located fluidically between the reservoir 112 and the primary power transmission unit 104. When present, the replenishing check valve 150 may be provided to assist with refilling of the primary power transmission unit 104 (or components thereof) under predetermined conditions. For example, the replenishing check valve 150 may help to facilitate refilling of the chamber in front of the DAP head when a DAP-type primary power transmission unit 104 is building pressure during its retraction stroke by pushing fluid out of the annular chamber behind the DAP head. This is done, for example, during slip control if additional flow to the brakes is needed after the DAP is stroked fully forward.

A normally closed dual-acting plunger ("DAP") valve 152 and a normally open DAP valve 154 are interposed hydraulically between the primary power transmission unit 104 and at least one of the first and second three-way valves 146, 148.

ABS modulator arrangements 156 are interposed hydraulically between the primary power transmission unit 104 and the pairs of front and rear wheel brakes 102B, 102D and 102A, 102C. The ABS modulator arrangements 156 are each controlled by the first and/or second ECU 116A, 116B. The ABS modulator arrangements 156 each include respective serially arranged iso and dump valves 157 and 158. The iso valve 157 for each ABS modulator arrangement 156 is located hydraulically between a respective wheel brake 102 and the primary power transmission unit 104, and the dump valve 158 for each ABS modulator arrangement 156 is located hydraulically between a respective wheel brake 102 and the reservoir 112, for the corresponding wheel brake 102. Here, for clarity in FIGS. 1-2, the iso and dump valves 157 and 158 are appended with the letter "B" or "D", referencing a respective front wheel brake 102B and 102D, or the letter "A" or "C", referencing a respective rear wheel brake 102A and 102C, with which the so-labeled valves are respectively associated.

As shown in FIG. 1, the ABS modulator arrangements 156 may be interposed hydraulically between respective first or second three-way valves 146, 148 and corresponding ones of the pair of hydraulically actuated brakes.

Thus, the ABS modulator arrangement 156 downstream of the primary power transmission unit 104 includes iso and dump valves 157 and 158 which are controlled between their open and closed positions to provide different braking pressures among the wheel brakes 102, as desired for a particular braking situation. The ABS modulator arrangement 156 may selectively provide slip control to at least one wheel brake 102 of the pair of front wheel brakes 102B, 102C and the pair of rear wheel brakes 102A, 102D powered by the primary power transmission unit 104. More broadly, the ABS modulator arrangement 156, and/or other valves of the brake system 100, any of which may be solenoid-operated and have any suitable configurations, can be used to help provide controlled braking operations, such as, but not limited to, ABS, traction control, vehicle stability control, dynamic rear proportioning, regenerative braking blending, and autonomous braking.

Focusing now on the secondary pressure circuit schematically indicated by dashed line "2" in FIGS. 1-2, a secondary or backup arrangement is provided to power and control the pair of front brakes 102B, 102D hydraulically in the event of loss of fluid power from the primary power transmission unit 104, or for any other reason. Concurrently with provision of hydraulic power to the front brakes 102B, 102D from the secondary power transmission unit 106, the pair of rear brakes 102A, 102C could be at least partially applied electrically via the rear brake motors 118A, 118C, as desired.

In FIGS. 1-2, a secondary ABS ISO valve 162 is provided to each of the pair of front brakes 102B, 102D. This secondary ABS ISO valve 162 is of a normally-open type, and may be energized periodically (e.g., every ignition cycle of the vehicle) to assist with testing of the brake system 100. The first and second secondary ABS iso valves 162B and 162D, respectively, are each interposed hydraulically between at least a portion of the ABS modulator arrangement 156B, 156D and a corresponding one of the pair of front wheel brakes 102B, 102D. Each secondary ABS ISO valve 162 assists with providing pressure build in the respective one of the pair of front brakes 102B, 102D when there is a failure of the primary power transmission unit 104, the primary ECU 116A, or any other component that would otherwise, if working correctly, be contributing to a normal, non-failure braking mode/condition.

A multiplex control valve arrangement (shown generally at 160) is hydraulically interposed between the secondary power transmission unit 106 and at least a selected one of the pair of front wheel brakes 102B, 102D. The secondary electronic control unit 1168 may control the multiplex control valve arrangement 160 in a backup braking mode. The multiplex control valve arrangement 160 may include a first, normally open, iso valve 166 and a second, normally closed, dump valve 168, as shown in FIG. 1, for each wheel brake 102 of the pair of front wheel brakes 102B, 102D. The normally open iso valves 166 are shown in the "outboard" position in FIG. 1, with the normally closed dump valves 168 in the "inboard" position, but it is contemplated that those positions could be reversed for each of the multiplex control valve arrangements 160B and 160D. It is also contemplated that one or both of the normally open iso valves 166 could be omitted from the brake system 100 of FIG. 1.

The secondary electronic control unit 1168 may control at least one of the multiplex control valve arrangements 160B, 160D in a backup braking mode to provide a slip control feature to the pair of front wheel brakes 102B, 102D. That is, the normally open iso valves 166 and the normally closed dump valves 168 may be controlled as "back-to-back gatekeepers" for selective build and/or release of pressure from the secondary power transmission unit 106 within the multiplex control valve arrangement 160 to provide differential application of the pair of front brakes 102B, 102D in the backup braking mode. The iso-type valves 166, 168 can each block fluid flow in both directions when energized, and are plumbed in parallel and reverse orientations, as shown in the Figures.

It is contemplated that the components located inside dashed line "2" in FIG. 1 may be spaced apart in the vehicle, hydraulically if not also mechanically, from components outside that line (i.e., by being located remote from one another within the brake system 100, and at least apart from a common housing or block). One of ordinary skill in the art will readily be able to provide suitable first and second iso and dump valves 157 and 158 and/or iso-type valves 166, 168 for a desired use environment of the present invention.

The multiplex control facilitated by the multiplex control valve arrangement 160 selectively provides, for example, slip control or traction compensation to at least one of the wheel brakes 102. In summary, at least a portion of the ABS modulator arrangement 156 for each wheel brake 102 is hydraulically interposed between at least one of the first and second three-way valves 146 and 148 and at least a selected wheel brake 102 of the pair of front wheel brakes 102B, 102D and the pair of rear wheel brakes 102A, 102C.

Additionally, the pair of front wheel brakes 102B, 102D include multiplex functionality interposed hydraulically between each of the pair and the secondary power transmission unit 106, via the multiplex valve arrangements 160B, 160D.

Using the arrangement of valves in the Figures, the fluid pressures at each of the wheel brakes 102 can be controlled independently from one another during normal, non-failure operation even though the brake system 100 may include a single source of pressure (e.g., primary power transmission unit 104 and/or master cylinder 120).

In the brake system 100 shown in FIG. 1, non-powered evacuation and fill bleed could be facilitated by the depicted components/arrangement, such as, for example, by placement of the primary and/or secondary power transmission unit 104 and 106 in a fully advanced position and selective operation of the check valves in one or more of the normally open iso valves 166 and normally open dump valves 168.

With reference now to FIG. 2, a second configuration of the brake system 100 is depicted, parts or all of which can be used with other components of the present invention, as desired. Description of similar components and operation which is made elsewhere in this application will not necessarily be repeated for each and every described configuration or aspect of the brake system 100, for brevity, but should instead be considered to apply to like-numbered portions of other configurations as appropriate.

In the brake system 100 shown in FIG. 2, the multiplex control valve arrangement 160 includes a normally closed multiplex valve 170 for each wheel brake 102B, 102D of the pair of front wheel brakes. This normally closed multiplex valve 170 takes the place of the normally open iso valve 166 and normally closed dump valve 168 in the brake system 100 of FIG. 1.

In the brake system 100 of FIG. 2, independent multiplex control of each of the pair of front wheel brakes 102B, 102D can be provided with fewer total valves than in the brake system 100 of FIG. 1. However, if no separate bleed valve is provided, the brake system 100 shown in FIG. 2 will need to be powered for evac and fill bleeding. In addition, the normally closed multiplex valves 170 will be configured to hold off relatively high pressures in both upstream and downstream flow directions (unlike the unidirectional normally open iso valve 166 and normally closed dump valve 168 previously discussed), and thus will need to be designed with a relatively high spring force and robust construction. The normally closed multiplex valves 170 otherwise are used to operate the secondary pressure circuit of the brake system 100 shown in FIG. 2 similarly to the secondary pressure circuit of the brake system 100 shown in FIG. 1.

At least one filter 172 may be provided in any desired position(s) within the brake systems 100 of FIGS. 1-2.

Pressure of hydraulic fluid within the brake systems 100 of FIGS. 1-2 could be sensed, directly or indirectly, with a pressure sensor (shown generally as "P") at any desired location(s) in the brake systems 100. It is contemplated that the pressure sensor(s) will be in electrical communication with at least one of the primary and secondary ECUs 116A, 116B, in a wired or wireless manner, to communicate pressure signals thereto responsive to sensed fluid pressure(s).

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A brake system for actuating a pair of front wheel brakes and a pair of rear wheel brakes, the system comprising:
    a reservoir;
    a master cylinder operable to provide a brake signal responsive to actuation of a brake pedal connected thereto, the master cylinder being selectively operable during a manual push-through mode by actuation of the brake pedal to generate brake actuating pressure to at least one output for hydraulically actuating at least one of the pair of front wheel brakes and the pair of rear wheel brakes;
    a primary power transmission unit configured for selectively providing pressurized hydraulic fluid for actuating at least one of the pair of front wheel brakes and the pair of rear wheel brakes in a non-failure normal braking mode;
    a secondary power transmission unit configured for selectively providing pressurized hydraulic fluid for actuating the pair of front wheel brakes in a backup braking mode;
    a pair of rear brake motors for selectively electrically actuating respective rear wheel brakes;
    a primary electronic control unit for controlling at least one of the primary power transmission unit and the pair of rear brake motors;
    a secondary electronic control unit for controlling at least one of the secondary power transmission unit and the pair of rear brake motors;
    first and second two-position three-way valves, each of the first and second three-way valves being hydraulically connected with the master cylinder, the primary power transmission unit, and at least a selected wheel brake of each of the pairs of the front and rear wheel brakes, the first and second three-way valves selectively controlling hydraulic fluid flow from a chosen one of the master cylinder and the primary power transmission unit to at least the selected ones of the front and rear wheel brakes;
    an ABS modulator arrangement hydraulically interposed between at least one of the first and second three-way valves and at least a selected wheel brake of the pair of front wheel brakes and the pair of rear wheel brakes; and
    a multiplex control valve arrangement separate from the ABS modulator arrangement and hydraulically interposed between the secondary power transmission unit and at least a selected wheel brake of the pair of front wheel brakes, the multiplex control valve arrangement having a normally closed dump valve and a normally open iso valve for each wheel brake of the pair of front wheel brakes arranged such that hydraulic fluid flows through both the normally closed dump valve and the normally open iso valve prior to reaching the selected wheel brake of the pair of front wheel brakes.

2. The brake system of claim 1, wherein the primary power transmission unit is of a dual acting plunger type.

3. The brake system of claim 1, wherein the secondary power transmission unit is of a rack-and-pinion type.

4. The brake system of claim 1, wherein the secondary power transmission unit is of a ball-screw type.

5. The brake system of claim 1, including a normally closed DAP valve and a normally open DAP valve interposed hydraulically between the primary power transmission unit and the first and second three-way valves.

6. The brake system of claim 1, wherein the master cylinder includes a housing defining a longitudinally extending bore, and first and second springs longitudinally extending in series within the bore.

7. The brake system of claim 1, wherein the multiplex control valve arrangement selectively provides slip control to the at least one of the pair of front wheel brakes and the rear wheel brakes which is powered by the secondary power transmission unit.

8. The brake system of claim 7, wherein the ABS modulator arrangement includes a corresponding iso valve and a corresponding dump valve for each wheel brake of the pair of front wheel brakes and the pair of rear wheel brakes.

9. The brake system of claim 1, wherein the multiplex control valve arrangement includes first and second iso-type valves interposed hydraulically between at least a portion of the ABS modulator arrangement and a corresponding one of the pair of front wheel brakes.

10. The brake system of claim 1, wherein the secondary electronic control unit controls the multiplex control valve arrangement in a backup braking mode.

11. The brake system of claim 10, wherein the secondary electronic control unit controls the multiplex control valve arrangement in a backup braking mode to provide a slip control feature to the pair of front wheel brakes.

12. The brake system of claim 1, including a simulator test valve located fluidically between the reservoir and the master cylinder, the simulator test valve including a test valve spring biasing the simulator test valve toward an open condition.

13. The brake system of claim 1, wherein the master cylinder is of a tandem master cylinder type.

14. The brake system of claim 1, including a pedal simulator in selective fluid communication with the master cylinder for providing predetermined brake pedal response.

15. A brake system for actuating a pair of front wheel brakes and a pair of rear wheel brakes, the system comprising:
   a reservoir;
   a master cylinder operable to provide a brake signal responsive to actuation of a brake pedal connected thereto, the master cylinder being selectively operable during a manual push-through mode by actuation of the brake pedal to generate brake actuating pressure to at least one output for hydraulically actuating at least one of the pair of front wheel brakes and the pair of rear wheel brakes;
   a primary power transmission unit configured for selectively providing pressurized hydraulic fluid for actuating at least one of the pair of front wheel brakes and the pair of rear wheel brakes in a non-failure normal braking mode;
   a secondary power transmission unit configured for selectively providing pressurized hydraulic fluid for actuating the pair of front wheel brakes in a backup braking mode;
   a pair of rear brake motors for selectively electrically actuating respective rear wheel brakes;
   a primary electronic control unit for controlling at least one of the primary power transmission unit and the pair of rear brake motors;
   a secondary electronic control unit for controlling at least one of the secondary power transmission unit and the pair of rear brake motors;
   first and second two-position three-way valves, each of the first and second three-way valves being hydraulically connected with the master cylinder, the primary power transmission unit, and at least a selected wheel brake of each of the pairs of the front and rear wheel brakes, the first and second three-way valves selectively controlling hydraulic fluid flow from a chosen one of the master cylinder and the primary power transmission unit to at least the selected ones of the front and rear wheel brakes;
   an ABS modulator arrangement hydraulically interposed between at least one of the first and second three-way valves and at least a selected wheel brake of the pair of front wheel brakes and the pair of rear wheel brakes; and
   a multiplex control valve arrangement separate from the ABS modulator arrangement and hydraulically interposed between the secondary power transmission unit and at least a selected wheel brake of the pair of front wheel brakes, wherein the multiplex control valve arrangement consists of a normally closed multiplex valve for each wheel brake of the pair of front wheel brakes for controlling hydraulic fluid flow in both directions between the secondary power transmission unit and the selected wheel brake of the pair of front wheel brakes.

16. The brake system of claim 15, wherein the multiplex control valve arrangement selectively provides slip control to the at least one of the pair of front wheel brakes and the rear wheel brakes which is powered by the secondary power transmission unit.

17. The brake system of claim 16, wherein the ABS modulator arrangement includes a corresponding iso valve and a corresponding dump valve for each wheel brake of the pair of front wheel brakes and the pair of rear wheel brakes.

18. The brake system of claim 15, wherein the secondary electronic control unit controls the multiplex control valve arrangement in a backup braking mode.

19. The brake system of claim 18, wherein the secondary electronic control unit controls the multiplex control valve arrangement in a backup braking mode to provide a slip control feature to the pair of front wheel brakes.

* * * * *